(12) United States Patent
Tanaka

(10) Patent No.: US 12,103,169 B2
(45) Date of Patent: Oct. 1, 2024

(54) ABNORMALITY DIAGNOSIS DEVICE AND ABNORMALITY DIAGNOSIS METHOD

(71) Applicant: Nissan Motor Co., Ltd., Kanagawa (JP)

(72) Inventor: Yasuhiro Tanaka, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 713 days.

(21) Appl. No.: 17/266,402

(22) PCT Filed: Aug. 6, 2018

(86) PCT No.: PCT/JP2018/029338
§ 371 (c)(1),
(2) Date: Feb. 5, 2021

(87) PCT Pub. No.: WO2020/031225
PCT Pub. Date: Feb. 13, 2020

(65) Prior Publication Data
US 2021/0178615 A1    Jun. 17, 2021

(51) Int. Cl.
*B25J 19/06*    (2006.01)
*G01L 5/00*    (2006.01)
(Continued)

(52) U.S. Cl.
CPC ............. *B25J 19/06* (2013.01); *G01L 5/0061* (2013.01); *G05B 13/0265* (2013.01);
(Continued)

(58) Field of Classification Search
CPC .... B25J 19/05; G01L 5/0061; G05B 13/0265; G05B 23/0224; G05B 23/0283; G06N 20/00
See application file for complete search history.

(56) References Cited

U.S. PATENT DOCUMENTS 6,820,038 B1 * 11/2004  Wetzer ................... G06Q 10/08
                                                                    702/184
2007/0250246 A1 * 10/2007  Balasu .................. B60T 17/221
                                                                    701/101
(Continued)

FOREIGN PATENT DOCUMENTS

JP    2005-202886 A     7/2005
JP    2005-339142 A    12/2005
(Continued)

*Primary Examiner* — Manish S Shah
*Assistant Examiner* — Christian T Bryant
(74) *Attorney, Agent, or Firm* — Osha Bergman Watanabe & Burton LLP

(57) ABSTRACT

An abnormality diagnosis device diagnoses an abnormality of a plurality of speed reducers included in a robot in accordance with disturbance torque regarding a state of the respective speed reducers acquired from a sensor installed in the robot, and outputs a result of the diagnosis to a display unit, the abnormality diagnosis device including a maintenance history DB configured to store maintenance data on maintenance made for the respective speed reducers, and a control unit configured to detect an abnormality in the respective speed reducers in accordance with the disturbance torque. The control unit, when detecting an abnormality in one speed reducer in accordance with the disturbance torque, predicts an abnormality in another speed reducer caused in association with the abnormality in the one speed reducer in accordance with the maintenance data, and outputs information on the predicted abnormality to the display unit.

15 Claims, 10 Drawing Sheets

(51) Int. Cl.
   *G05B 13/02*       (2006.01)
   *G06N 20/00*       (2019.01)
   *G05B 23/02*       (2006.01)

(52) U.S. Cl.
   CPC ......... *G06N 20/00* (2019.01); *G05B 23/0224* (2013.01); *G05B 23/0283* (2013.01)

(56) References Cited

U.S. PATENT DOCUMENTS

| | | | |
|---|---|---|---|
| 2010/0155634 A1* | 6/2010 | do Amaral | G05B 23/0237 73/1.72 |
| 2016/0135706 A1* | 5/2016 | Sullivan | A61B 7/003 600/509 |
| 2018/0284758 A1* | 10/2018 | Cella | G05B 23/0291 |

FOREIGN PATENT DOCUMENTS

| | | |
|---|---|---|
| JP | 2009-252085 A | 10/2009 |
| JP | 2011-48760 A | 3/2011 |
| JP | 2015-27229 A | 2/2015 |
| WO | 03021502 A2 | 3/2003 |

* cited by examiner

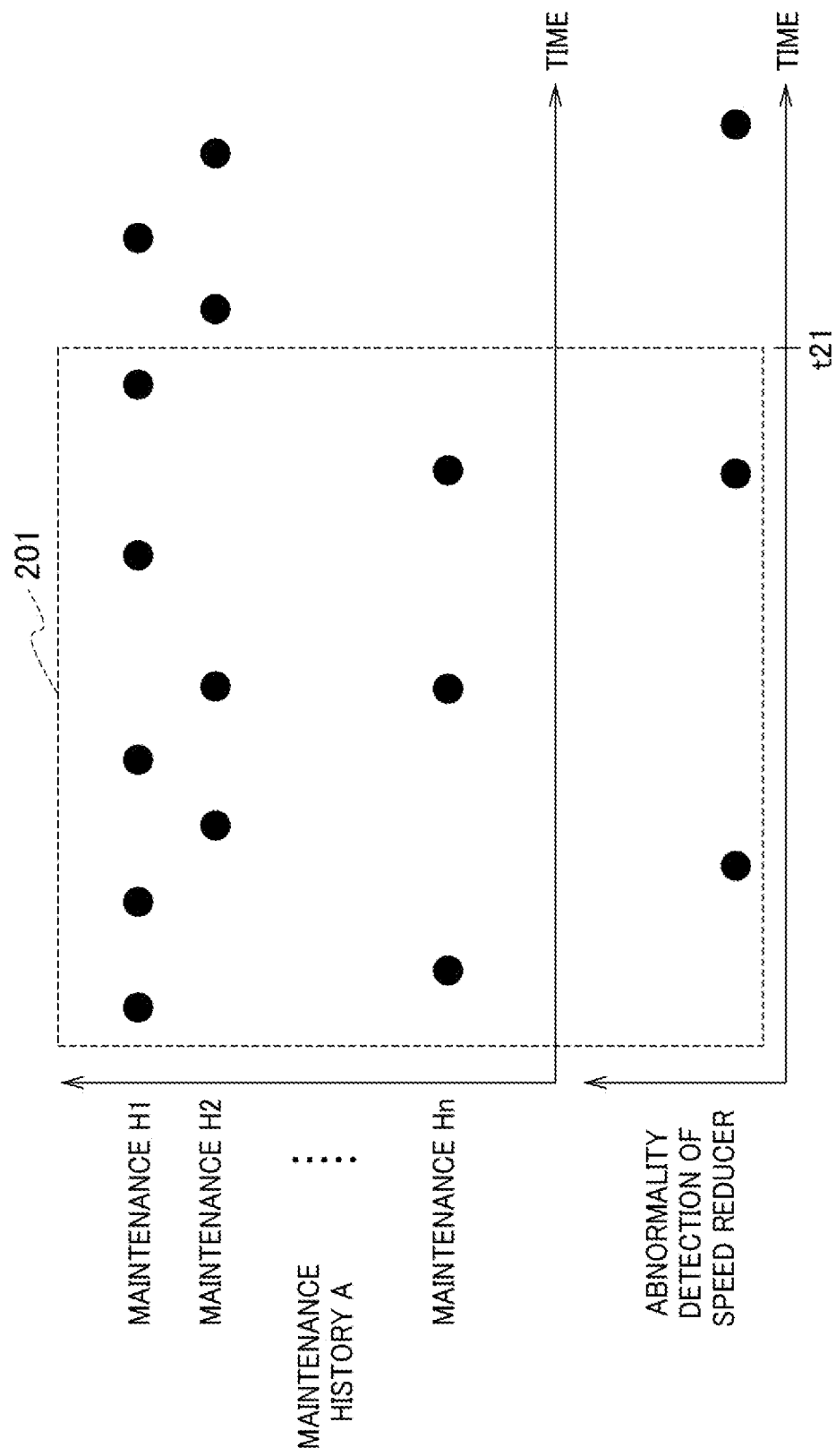

ABNORMALITY DIAGNOSIS DEVICE AND ABNORMALITY DIAGNOSIS METHOD

TECHNICAL FIELD

The present invention relates to an abnormality diagnosis device and an abnormality diagnosis method of diagnosing an abnormality caused in a movable part such as a speed reducer provided in an apparatus such as a robot.

BACKGROUND ART

Devices are known that detect an abnormality caused in an apparatus, as disclosed in Patent Document 1, for example. Patent Document 1 discloses a device that records an abnormality caused in an apparatus as a target to be diagnosed while associating the abnormality with a date, sound data, true-or-false results of diagnosis, and records of operations (such as the presence or absence of inspections, the presence or absence of problems, and an executed time and place), and notifies a user of a similar case having been caused before regarding sound produced upon the occurrence of an abnormality in the apparatus.

CITATION LIST

Patent Literature

Patent Document 1: Japanese Unexamined Patent Application Publication No. 2005-339142

SUMMARY OF INVENTION

Technical Problem

Patent Document 1, however, cannot recognize a cause-and-effect relationship between the target apparatus to be diagnosed and other apparatuses when an abnormality is caused in the target apparatus.

In view of the foregoing problem, the present invention provides an abnormality diagnosis device and an abnormality diagnosis method capable of, when an abnormality is caused in one movable part, predicting and notifying an abnormality of another associated movable part to an operator.

Technical Solution

An aspect of the present invention includes a maintenance history storage unit configured to store maintenance data on maintenance made for each movable part, and a control unit configured to diagnose an abnormality in each movable part. The control unit, when detecting an abnormality in one movable part in accordance with movable-part data, predicts an abnormality in another movable part caused in association with the abnormality in the one movable part in accordance with the maintenance data, and outputs information on the abnormality predicted in the other movable part.

Advantageous Effects

The aspect of the present invention, when an abnormality is caused in one movable part, can predict and notify an abnormality of another associated movable part to an operator.

BRIEF DESCRIPTION OF DRAWINGS

FIG. 11 is a timing chart showing maintenance (H1 to Hn) executed in the respective speed reducers and an abnormality detected in the respective speed reducers.

DESCRIPTION OF EMBODIMENTS

Embodiments of the present invention will be described below with reference to the drawings.

Explanations of First Embodiment

Figure 1:
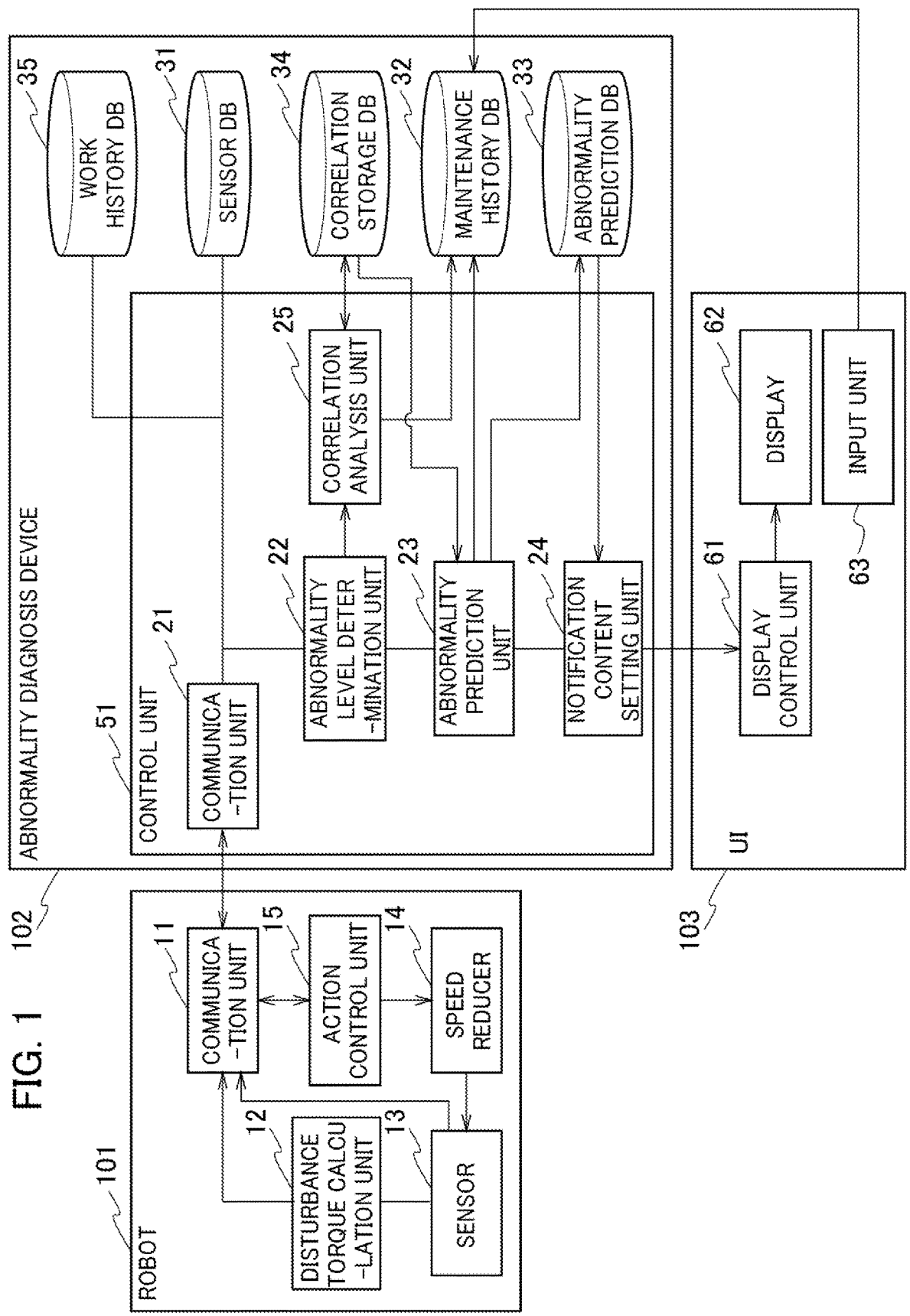
FIG. 1 is a block diagram illustrating a configuration of an abnormality diagnosis device according to an embodiment of the present invention, and peripheral apparatuses.

FIG. 1 is a block diagram illustrating a configuration of an abnormality diagnosis device according to one embodiment of the present invention, and peripheral apparatuses. As illustrated in FIG. 1, the abnormality diagnosis device 102 according to the present embodiment is connected to a robot 101 (an apparatus) and a user interface 103 (indicated by reference sign "UI" in FIG. 1). The abnormality diagnosis device 102 diagnoses an abnormality of the robot 101, and outputs data regarding the diagnosis results to a display 62 (a display unit) provided in the user interface 103 so as to display the diagnosis results on the display 62. As used herein, the phrase "diagnosing an abnormality" encompasses a concept of not only determining an abnormality currently caused but also predicting an abnormality which can be caused in the future.

The robot 101 is a teaching-playback multi-axis robot, for example. The term "teaching-playback" is indicative of a function of actually operating a robot to make action by an operator using a teaching pendant belonging to the robot, and storing and reproducing the action so as to cause the robot to perform the action. While the present embodiment is illustrated with the teaching-playback robot, the present invention is not limited to this case.

As illustrated in FIG. 1, the robot 101 includes a speed reducer 14 (a movable part), an action control unit 15, a sensor 13, a disturbance torque calculation unit 12, and a communication unit 11. While the robot 101 includes a plurality of speed reducers 14, FIG. 1 illustrates only one speed reducer 14.

Each speed reducer 14 includes a servo motor (simply referred to below as a "motor") for operating each joint shaft of a robot arm, and is operated in accordance with the control by the action control unit 15. The operation of the respective speed reducers 14 causes a welding electrode (a welding part) mounted at the tip of the robot arm, for example, to come into contact with a necessary part of a target object to be processed (for example, a metallic blank material) so as to execute the welding operation. The robot 101 can further execute various kinds of operations such as pressing, coating, resin molding, and assembling of a target object, in addition to the welding operation.

The sensor 13, which is mounted in the robot 101, includes a pulse generator and an encoder, for example, and detects various kinds of physical amounts such as a position and an angle of the robot arm operated by the respective speed reducers 14, a rotation angle, a rotation speed, power consumption, and a current of the motor provided at respective speed reducers 14, and a rotation angle of respective speed reducers 14. The sensor 13 also detects a value of torque caused in the motor of the respective speed reducers 14. The sensor data detected by the sensor 13 is sent to the abnormality diagnosis device 102 through the communication unit 11.

The action control unit 15 causes the respective speed reducers 14 to operate according to an action program set by the teaching described above, and controls the respective robot arms and the joint shafts mounted on the robot 101 to perform necessary actions. The action control unit 15 outputs work data acquired when the robot 101 is operated to the communication unit 11. The work data includes various kinds of information regarding the work of the robot 101. The specific explanations are made below.

The disturbance torque calculation unit 12 calculates disturbance torque caused in the motor of the respective speed reducers 14. The term "disturbance torque" refers to a difference between a torque command value when controlling each motor and a torque detection value detected by the sensor 13. The difference between the torque command value and the torque detection value is substantially constant when the motor is in a normal state and the speed reducer 14 operates stably, and the disturbance torque thus shows a stable numerical value. When an abnormality is caused in the speed reducer 14, the operation of the corresponding speed reducer 14 is not stable, and a great change occurs in the disturbance torque. The disturbance torque is an example of movable-part data regarding the state of the movable part (the speed reducer 14).

The communication unit 11 sends the work data of the robot 101, the disturbance torque calculated by the disturbance torque calculation unit 12, and various kinds of sensor data detected by the sensor 13 to the abnormality diagnosis device 102.

The respective functions that the robot 101 has can be implemented in single or plural processing circuits. The respective processing circuits include a programmed processing device, such as a processing device including an electric circuit. The processing device includes an application-specific integrated circuit (ASIC) configured to execute the functions that the robot 101 has, and conventional circuit components.

The user interface 103 includes the display 62 for displaying the various kinds of information, and a display control unit 61 for controlling a displaying state of the various kinds of information sent from the abnormality diagnosis device 102. The user interface 103 further includes an input unit 63 on which the operator executes various kinds of operations. When the operator inputs maintenance data indicating that maintenance has been made for the robot 101 via the input unit 63, the user interface 103 writes the input maintenance data to a maintenance history DB 32 (a maintenance history storage unit) described below. The user interface 103 may be a tablet terminal, for example.

Next, the configuration of the abnormality diagnosis device 102 is described below. The abnormality diagnosis device 102 includes a control unit 51 and various kinds of databases (DBs). The control unit 51 includes a communication unit 21, an abnormality level determination unit 22, an abnormality prediction unit 23, a notification content setting unit 24, and a correlation analysis unit 25. The databases include a sensor DB 31, the maintenance history DB 32 (the maintenance history storage unit), an abnormality prediction DB 33, a correlation storage DB 34 (a correlation storage unit), and a work history DB 35.

The sensor DB 31 stores the sensor data such as the position and the angle of the respective robot arms and the rotation angle and the rotation speed of the respective motors detected by the sensor 13. The sensor DB 31 also stores the disturbance torque calculated by the disturbance torque calculation unit 12 (the data regarding the state of the apparatus).

The work history DB 35 stores the work data of the robot 101. The work data includes various kinds of data regarding the work of the robot 101, such as a work date, a work-started time, a work-stopped time, a continuous work time, and a continuous suspension time. The work data also includes a drive mode of the speed reducers 14. The drive mode includes a regular drive mode, a maintenance mode, and a stop mode.

The maintenance history DB 32 stores the maintenance data on maintenance made for the robot 101 acquired when an abnormality is caused or the occurrence of an abnormality is predicted in the respective speed reducers 14. The maintenance data can be input by the operator through the input unit 63 of the user interface 103. Alternatively, the maintenance may be determined to be made when the robot 101 is operated in the maintenance mode described above, so as to automatically create and store the maintenance data. The maintenance data includes an ID number of the speed reducer 14 having been maintained, an ID number of the motor mounted on the corresponding speed reducer 14, the date and time of the maintenance executed, and the contents of the maintenance (such as a replacement, a repair, and a change of grease).

The correlation storage DB 34 stores a correlation drawn by the correlation analysis unit 25 (described in detail below). The correlation storage DB 34 also stores a correspondence relation between one speed reducer and other speed reducers operated in association with the one speed reducer provided in the robot 101. For example, in a case in which, when the robot 101 includes the six speed reducers 14 (herein illustrated with the speed reducers 14a, 14b, 14c, 14d, 14e, and 14f), the speed reducers 14a and 14b are operated in association with each other, and the speed reducers 14d, 14e, and 14f are operated in association with each other, the correlation storage DB 34 stores the corresponding relation between the respective speed reducers 14 in each set. The phrase "the speed reducers 14a and 14b are operated in association with each other" encompasses a concept in which the operation of the speed reducer 14a has some influence on the operation of the speed reducer 14b. Hereinafter, the speed reducers 14, when specified independently, are indicated with a suffix, such as the "speed reducer 14a" and the "speed reducer 14b", and are each referred to as the "speed reducer 14" when not particularly specified.

The abnormality prediction DB 33 stores abnormality prediction data predicted by the abnormality prediction unit 23 (described in detail below). For example, when detecting an abnormality of the disturbance torque in one speed reducer 14a and thus predicting that the speed reducer 14b operated in association with the speed reducer 14a has an abnormality, the abnormality prediction DB 33 stores the predicted data as the abnormality prediction data.

The communication unit 21 communicates with the communication unit 11 included in the robot 101. The communication unit 21 receives the work data of the robot 101 sent from the robot 101, and outputs the work data to the work history DB 35. The communication unit 21 also receives the disturbance torque and the sensor data sent from the robot 101, and outputs the received data to the sensor DB 31.

Figure 6:
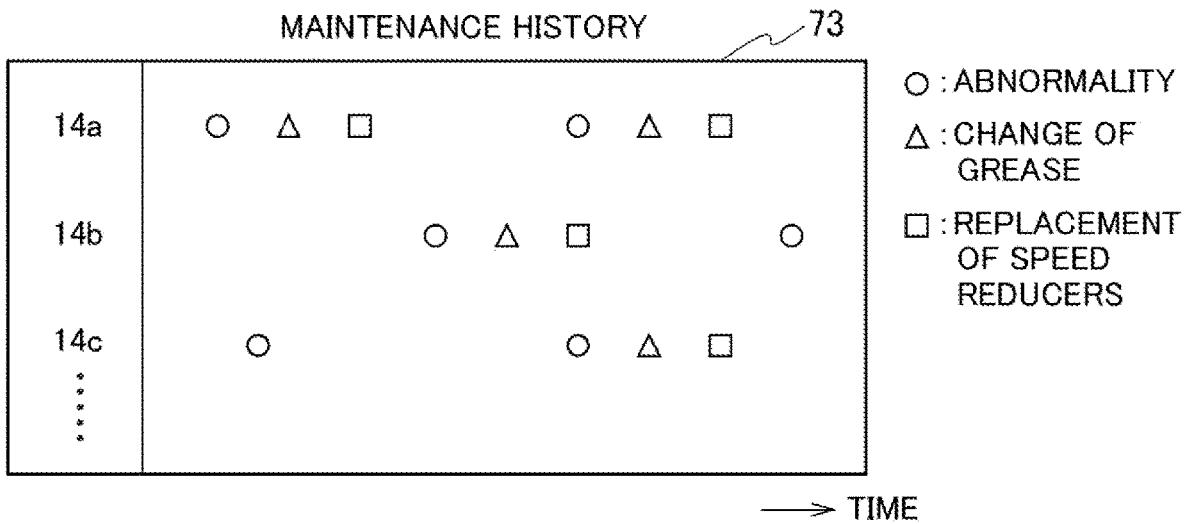
FIG. 6 is an explanatory diagram showing abnormality detected in each speed reducer and execution of maintenance.

The correlation analysis unit 25 executes the correlation analysis of the abnormality caused in the respective speed reducers 14 according to the maintenance data of the respective speed reducers 14 stored in the maintenance history DB 32. FIG. 6 illustrates an example of the maintenance history of the respective speed reducers 14, in which the axis of abscissas indicates the time with a span from one to several weeks. The sign "circle" in FIG. 6 indicates an abnormality caused in the respective speed reducers 14, the sign "triangle" indicates the execution of maintenance of changing grease, and the sign "square" indicates the execution of maintenance of replacing the speed reducers 14. As illustrated in FIG. 6, the replacement of the speed reducers 14 is executed with high frequency within several days from the point when an abnormality is caused and the grease is subsequently changed in the respective speed reducers 14a, 14b, and 14c. The change of grease and the subsequent replacement of the speed reducers 14 are thus determined to have a correlation. The correlation obtained by the correlation analysis is stored in the correlation storage DB 34.

The abnormality level determination unit 22 acquires the past disturbance torque applied to the motor mounted on the respective speed reducers 14 from the sensor DB 31, and calculates an abnormality level indicating a degree of abnormality of the disturbance torque acquired. A method of calculating the abnormality level is described below. The abnormality level a(x'), where x' is the disturbance torque, is given by the following formula (1):

$$a(x')=\{(x'-m)^2\}/2 \cdot s^2 \quad (1)$$

where m is a sample average of the disturbance torque, and s is a standard deviation of the disturbance torque.

The disturbance torque is determined to be abnormal when the abnormality level a(x') exceeds a predetermined reference value. FIG. 5(a) illustrates a waveform indicating the disturbance torque applied to the speed reducer 14a. The abnormality level is calculated according to the above formula (1) on the basis of the disturbance torque shown in FIG. 5(a). The calculation leads to the abnormality level as shown in FIG. 5(b). For example, the disturbance torque is determined to be abnormal since the abnormality level exceeds the reference value (1.0) at a point indicated by reference sign p1 in FIG. 5(b).

Instead of the above method, the abnormality level may be calculated by use of kernel density estimation or density ratio estimation. Still another method of determining the abnormality level is to calculate a difference between the disturbance torque and a predetermined value, and further calculate a rate of change in the difference with the passage of time. The corresponding disturbance torque can be determined to be abnormal when the rate of change calculated exceeds a predetermined threshold. The predetermined value may be an average of the disturbance torque acquired in the same month one year ago.

The abnormality prediction unit 23 determines or predicts an abnormality caused in the respective speed reducers 14 in accordance with the abnormality level calculated for each speed reducer 14. When the abnormality level of one speed reducer 14a is determined to be high according to the abnormality level calculated by the abnormality level determination unit 22 described above, the speed reducer 14a is determined to have an abnormality. The abnormality prediction unit 23 also acquires a list of the speed reducers 14 operated in association with the speed reducer 14a while referring to the correlation storage DB 34. In the present embodiment, the speed reducer 14b is presumed to be indicated in the list acquired. The plural speed reducers 14 may be operated in association with the speed reducer 14a, but the present embodiment is illustrated with the case of only the speed reducer 14b for illustration purposes.

The abnormality prediction unit 23 detects an abnormality caused in each of the speed reducers 14a and 14b according to the maintenance data (such as the maintenance time and the contents of the maintenance) of the speed reducers 14a and 14b stored in the maintenance history DB 32 and the correlation stored in the correlation storage DB 34.

For example, as shown in FIG. 6, when the grease is changed after an abnormality is detected in one speed reducer 14, the maintenance of replacing the speed reducers 14 is subsequently made with high frequency. The change of the grease and the subsequent replacement of the speed reducers 14 are thus determined to have a correlation. When the point of detection of the abnormality in the speed reducer 14a is after the execution of the change of the grease in the speed reducer 14b, the probability is determined to be high that the abnormality is caused in the speed reducer 14b that needs to be replaced to another speed reducer 14, so as to predict that the speed reducer 14b has an abnormality. Namely, the abnormality prediction unit 23 refers to the correlation stored in the correlation storage DB 34 when the abnormality is detected in the speed reducer 14a (one movable part), and predicts the abnormality in the speed reducer 14b (the other movable part) having the correlation with the abnormality detected in the speed reducer 14a.

Figure 7A:
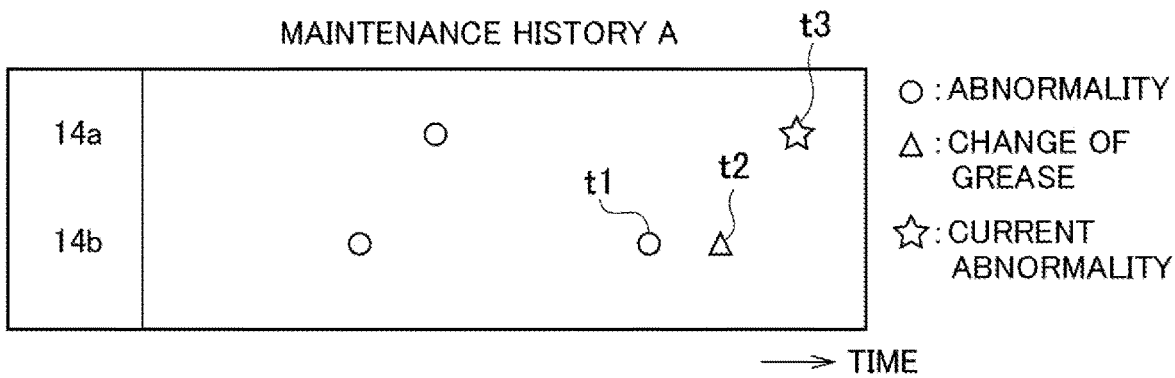
FIG. 7A is an explanatory diagram showing a maintenance history A.
Figure 7B:
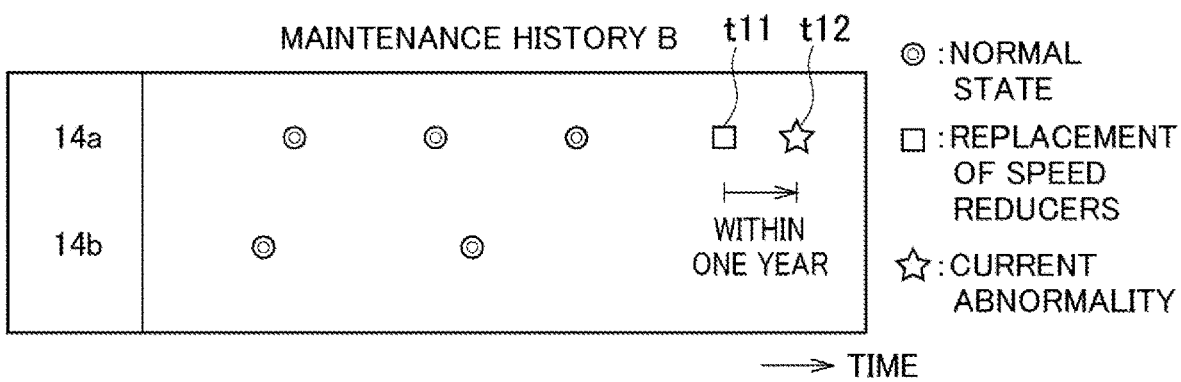
FIG. 7B is an explanatory diagram showing a maintenance history B.

The more specific explanations are made below with reference to FIG. 7A and FIG. 7B. FIG. 7A is a diagram illustrating the abnormality having been detected in the respective speed reducers 14a and 14b and the maintenance having been made before, in which the axis of abscissas indicates the time with a span from one to several weeks. This is referred to herein as a "maintenance history A". FIG. 7B is a diagram illustrating the abnormality having been detected in the respective speed reducers 14a and 14b and the maintenance having been made before, in which the axis of abscissas indicates the time with a span from one to several years. This is referred to herein as a "maintenance history B". The sign "star" in FIG. 7A indicates an abnormality detected this time, and the sign "double circle" in FIG. 7B indicates no detection of abnormality, namely, indicates that the respective speed reducers are in a normal state. In addition, the sign "circle" indicates the occurrence of abnormality, the sign "triangle" indicates the change of grease, and the sign "square" indicates the replacement of the speed reducers 14.

As illustrated in the maintenance history A in FIG. 7A, the abnormality is caused in the speed reducer 14b at the time t1, and the change of grease is subsequently executed at the time t2. The detection of abnormality this time in the speed reducer 14a is made at the time t3.

As illustrated in the maintenance history B in FIG. 7B, the replacement of the speed reducer 14a to another speed reducer 14 is made at the time t11, and the detection of abnormality this time is subsequently made at the time t12 (corresponding to the time t3 in FIG. 7A) within one year from the replacement.

The abnormality prediction unit 23 determines that the probability of occurrence of the abnormality in the speed reducer 14a is low, since the abnormality detected this time in the speed reducer 14a (at the time t3 in FIG. 7A and the time t12 in FIG. 7B) is within one year from the previous replacement of the speed reducer 14a.

The change of grease is made in the speed reducer 14b at the time t2 in FIG. 7A. According to the correlation stored in the correlation storage DB 34, the probability that the speed reducer 14b has an abnormality is high. In particular, with reference to the maintenance history A illustrated in FIG. 7A, the abnormality has been detected in the speed reducer 14b at the time t1, and the maintenance of changing grease has been made at the time t2, so that the probability is determined to be high that any abnormality requiring the replacement of the speed reducers 14 is caused in the speed reducer 14b at the time t3. Namely, the probability is determined to be high that the speed reducer 14a has an abnormality derived from the occurrence of the abnormality in the speed reducer 14b, since the speed reducer 14a is operated in association with the speed reducer 14b.

The abnormality prediction unit 23 thus determines that the probability is high that the speed reducer 14b operated in association with the speed reducer 14a has an abnormality, even though the abnormality has been detected in the speed reducer 14a, and predicts the occurrence of the abnormality in the speed reducer 14b in addition to the speed reducer 14a. The abnormality prediction unit 23, when detecting the abnormality in the speed reducer 14a, refers to the maintenance data regarding the abnormality in at least one (the speed reducer 14b) of the other speed reducers 14, so as to determine the information on the abnormality of the speed reducer 14b.

The notification content setting unit 24 sets the contents to be provided to the user through the indication on the display 62 of the user interface 103. The notification content setting unit 24 generates a tree image 73 indicating, with a tree structure, the abnormality diagnosis results of the speed reducers 14 determined to have an abnormality by the abnormality prediction unit 23.

Figure 8:
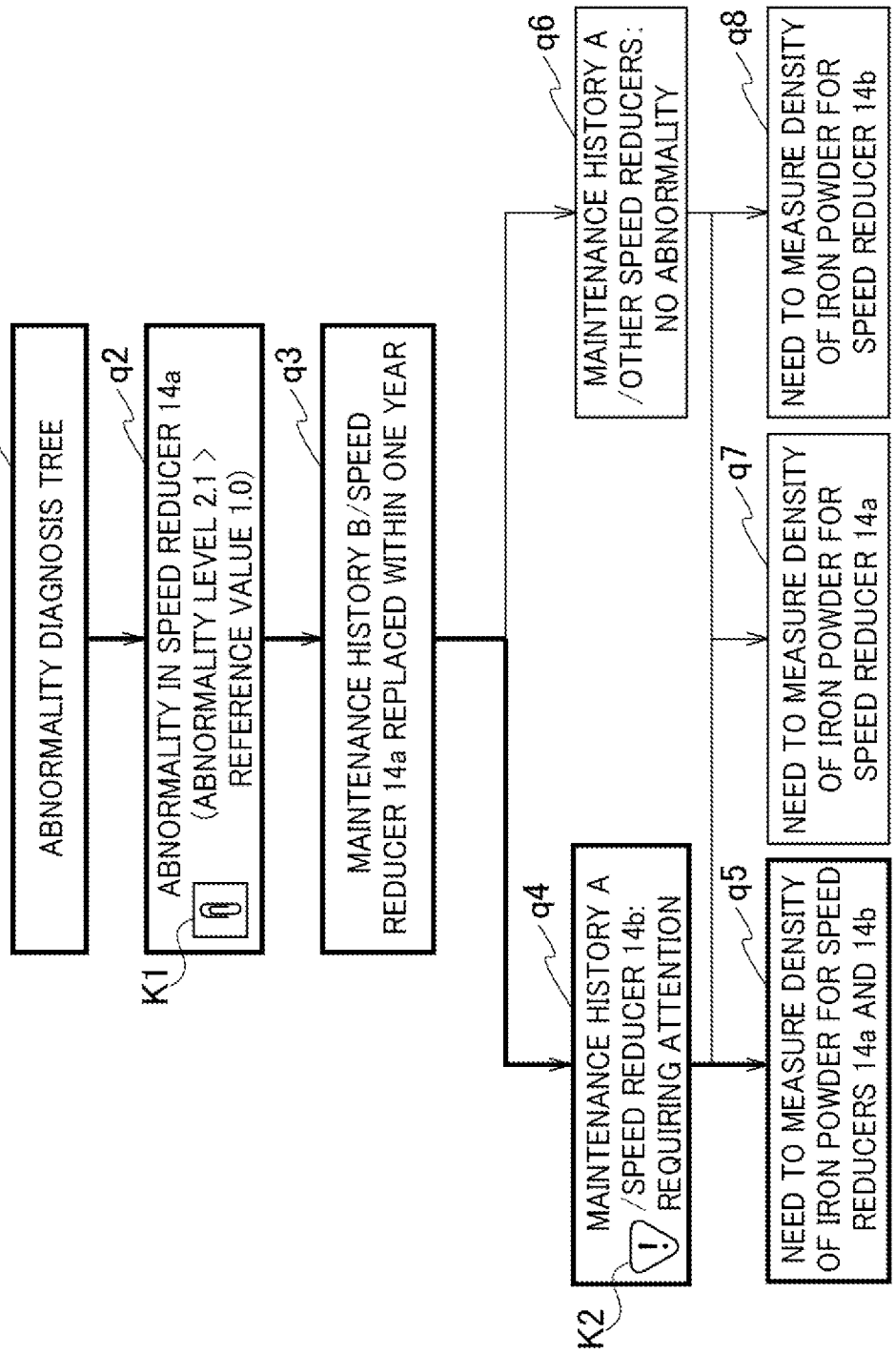
FIG. 8 is an explanatory diagram showing a tree image indicating details of abnormality diagnosis.

FIG. 8 is an explanatory view showing an example of the tree image 73. For example, when an abnormality is detected in the speed reducer 14a, an image indicating "Abnormality diagnosis tree" is created as shown in the block q1 in FIG. 8. As shown in the block q2, an image indicating "Abnormality level 2.1>Reference value 1.0" is created in which the numerical value of the abnormality level "2.1" calculated this time is greater than the reference value "1.0". In addition, an image of sign K1 is created for easy recognition of the correspondence with the waveform of the abnormality level, as described below. The term "sign" as used herein encompasses a concept including characters, a predetermined mark, and an icon.

As shown in the block q3, an image indicating "Reference history B" and "Speed reducer 14a replaced within one year" is created. As shown in the block q4, an image indicating "Reference history A" and "Speed reducer 14b: requiring attention" is created.

In addition, an image indicating the contents of the maintenance to be executed for this abnormality. The abnormality in this case is presumed to be caused in the speed reducer 14a or the speed reducer 14b, and an image indicating the execution of the maintenance, "Need to measure the density of iron powder in the grease for the speed reducers 14a and 14b", is creased as shown in the block q5. The tree image 73 includes maintenance commands for the speed reducer 14a and for the speed reducer 14b predicted to have an abnormality, and is associated with the relation between the occurrence of the abnormality and the maintenance commands.

The blocks q1 to a5 showing the process from the occurrence of the abnormality to the execution of the maintenance are indicated with the display frames surrounded by the thick lines, while the other blocks q6, q7, and q8 are indicated with the display frames surrounded by the thin lines. These indications can allow the operator to systematically recognize the details until the prediction of the abnormality in the speed reducer 14b made by the abnormality prediction unit 23 upon the detection of the abnormality in the speed reducer 14a. The set of the blocks q1 to q5 and the set of the blocks q6 to q8 may be indicated in different colors or by shading so as to provide the emphasized indications.

The notification content setting unit 24 thus creates the tree image 73 (refer to FIG. 9) with the tree structure indicating the information on the speed reducer 14a and the information on the speed reducer 14b (refer to the blocks q4, q6 in FIG. 8 and FIG. 9) when the abnormality is detected in the speed reducer 14a. The notification content setting unit 24 creates the tree image 73 indicating the information on the speed reducer 14b while varying the displaying pattern (such as the line thickness) depending on the contents of prediction of an abnormality in the speed reducer 14b.

Figure 5:
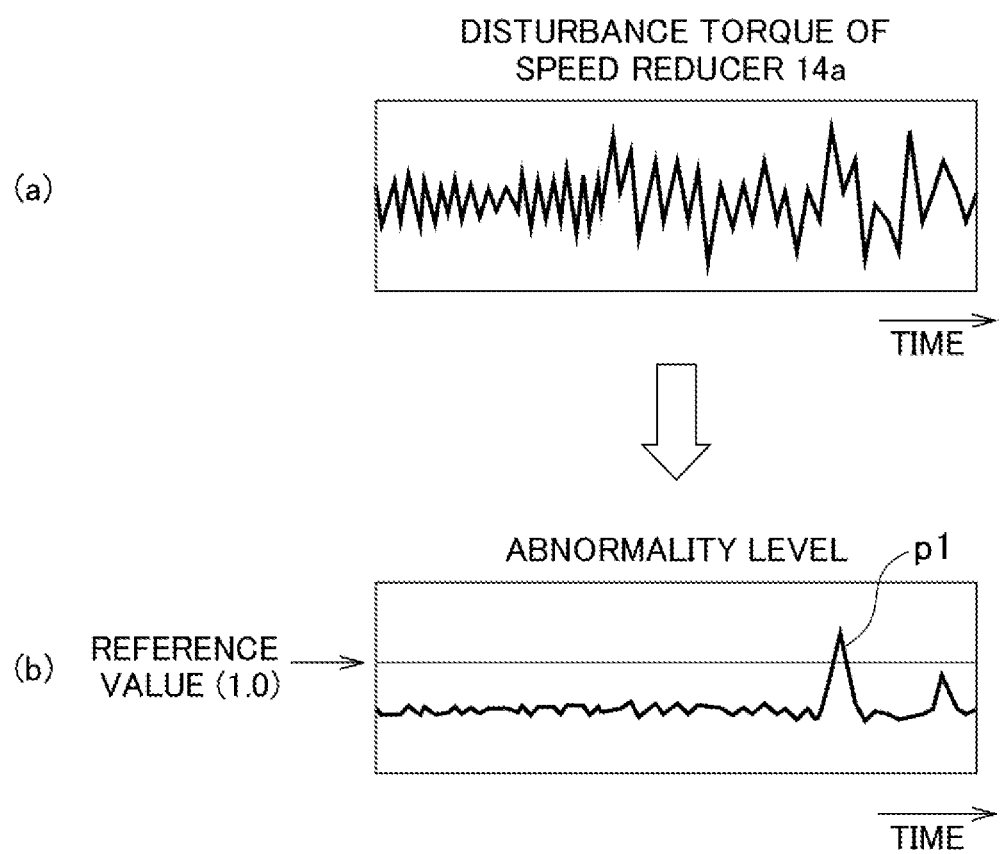
FIG. 5 is a graph showing a change in disturbance torque and abnormality level.
Figure 9:
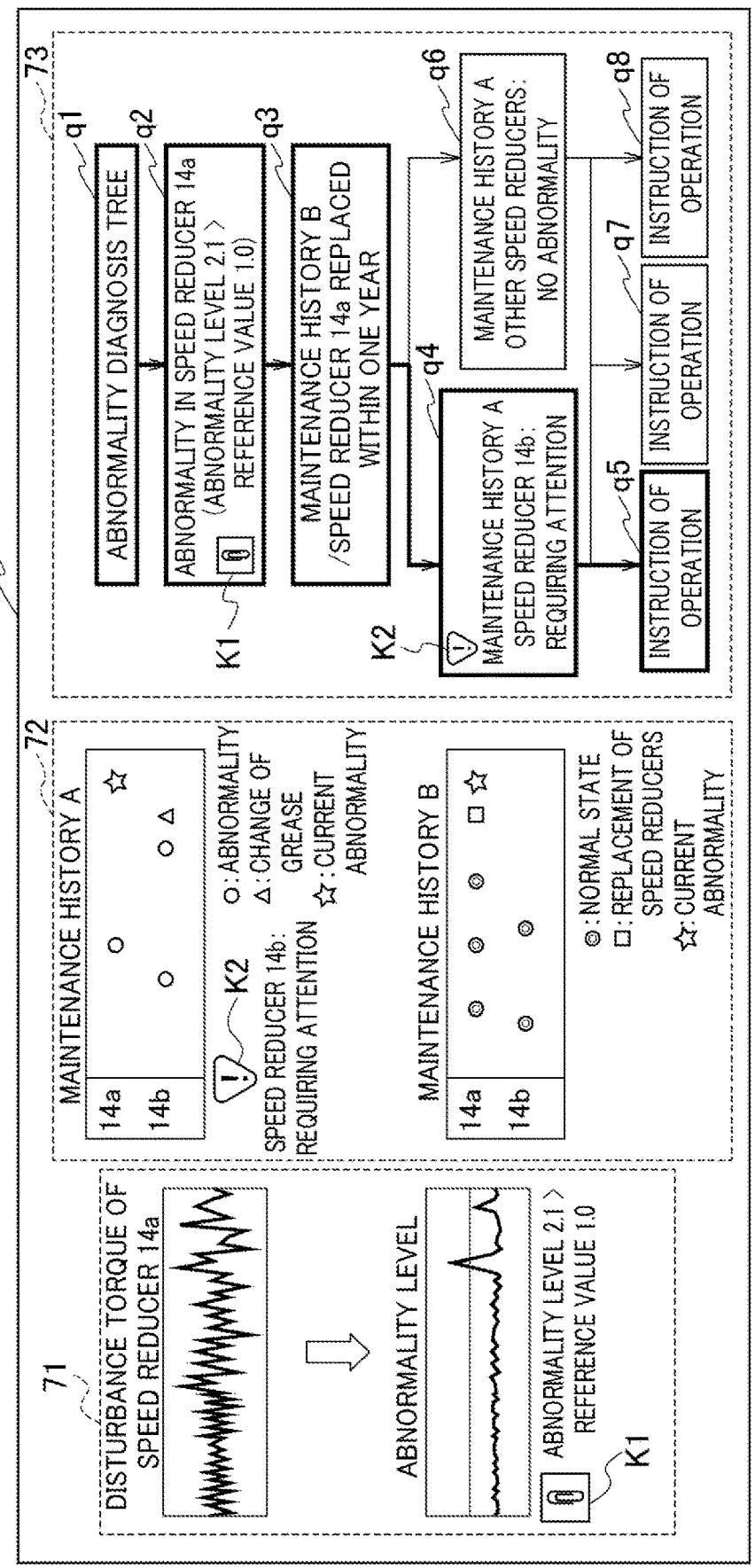
FIG. 9 is an explanatory diagram showing an abnormality diagnosis image displayed on a display.

The notification content setting unit 24 creates, in addition to the tree image 73, an abnormality level display image 71 showing the waveform of the disturbance torque and the waveform of the abnormality level as illustrated in FIG. 5, and a maintenance history image 72 as shown in FIG. 7A and FIG. 7B. The maintenance history image 72 includes an image indicating the maintenance history A (a first maintenance history image) and an image indicating the maintenance history B (a second maintenance history image) having a different scale in the time axis from the maintenance history A. The notification content setting unit 24 creates an abnormality diagnosis image 70 as shown in FIG. 9 by combining the respective images 71, 72, and 73 created. The blocks q5, q7, and q8 shown in FIG. 9 indicate the same operation commands as the blocks q5, q7, and q8 shown in FIG. 8.

Figure 2:
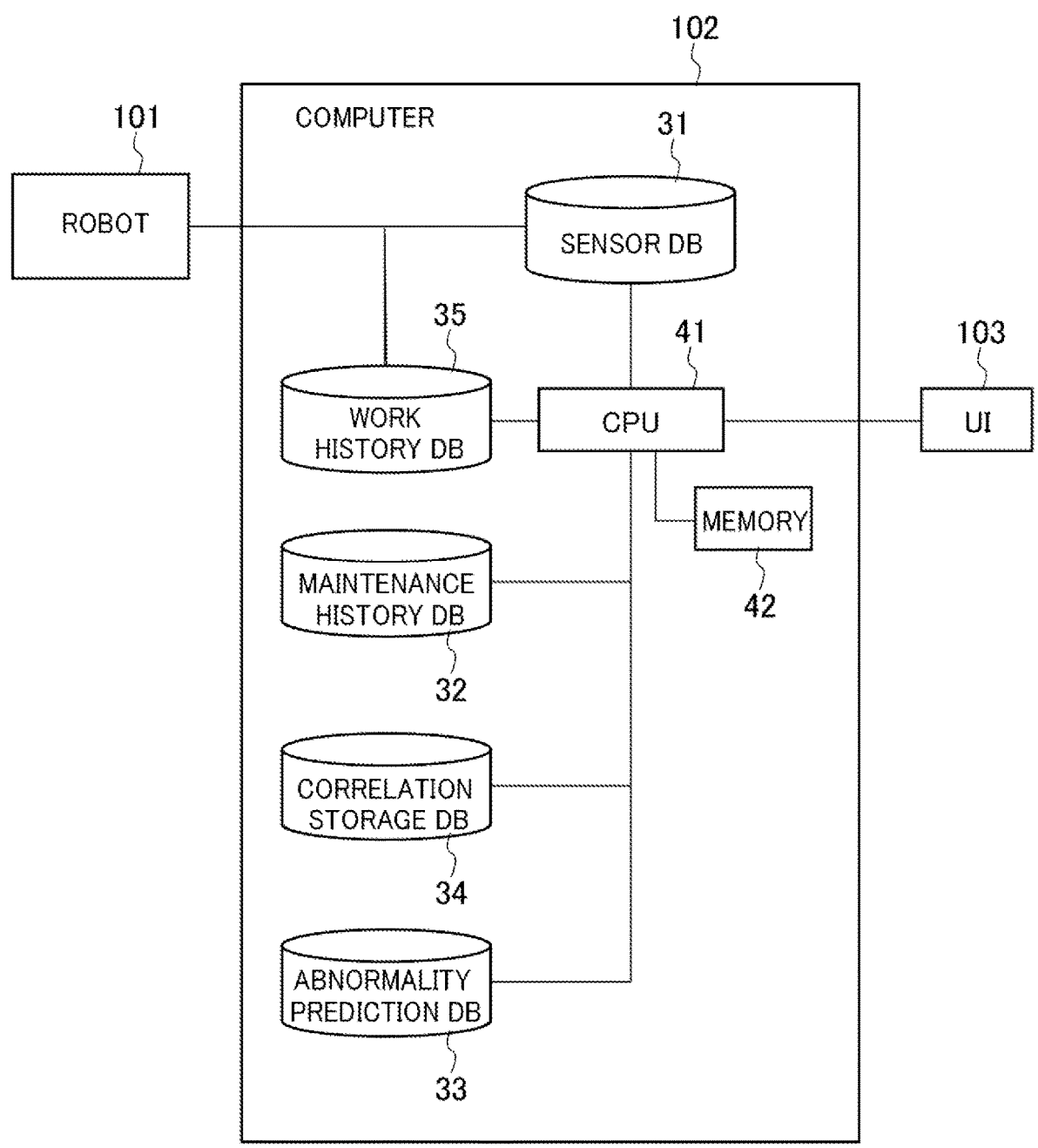
FIG. 2 is an explanatory diagram showing an example in which the abnormality diagnosis device shown in FIG. 1 is implemented by an integrated computer.

The abnormality diagnosis device 102 may be implemented by a computer including a central processing unit (CPU) 41, a memory 42, and the various databases (the sensor DB 31, the maintenance history DB 32, the abnormality prediction DB 33, the correlation storage DB 34, and the work history DB 35), as illustrated in FIG. 2. A computer program (an abnormality diagnosis program) is installed on the computer and executed so as to function as the abnormality diagnosis device 102. The CPU 41 thus functions as a plurality of information processing circuits included in the abnormality diagnosis device 102, namely, functions as the communication unit 21, the abnormality level_determination unit 22, the abnormality prediction unit 23, the notification content setting unit 24, and the correlation analysis unit 25.

The respective functions included in the abnormality diagnosis device 102 described above can be implemented in single or plural processing circuits. The respective processing circuits include a programmed processing device, such as a processing device including an electric circuit. The processing device includes an application-specific integrated circuit (ASIC) configured to execute the functions included in the abnormality diagnosis device 102, and conventional circuit components.

Explanations of Operation of First Embodiment

Figure 3:
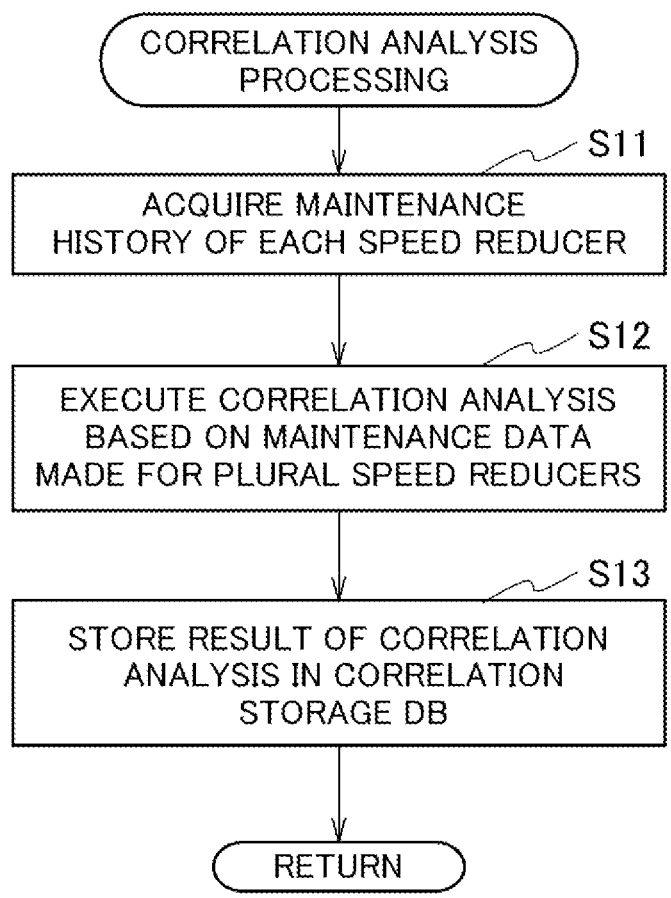
FIG. 3 is a flowchart showing a process of correlation analysis processing executed by the abnormality diagnosis device according to the present embodiment.

Next, the functions of the abnormality diagnosis device 102 according to the first embodiment are described below with reference to the flowcharts shown in FIG. 3 and FIG. 4. The flowchart shown in FIG. 3 illustrates a process of the correlation analysis processing executed by the correlation analysis unit 25.

First, in step S11, the correlation analysis unit 25 acquires the maintenance data on the maintenance executed for the respective speed reducers 14 from the maintenance history DB 32.

In step S12, the correlation analysis unit 25 executes the correlation analysis in accordance with the maintenance data on the maintenance executed for the respective speed reducers 14. For example, as shown in FIG. 6, when an abnormality is detected in one speed reducer 14 (indicated by the sign "circle" in FIG. 6), the maintenance operations are executed with high frequency such that the grease is changed (indicated by the sign "triangle" in FIG. 6), and the replacement of the speed reducers is subsequently made (indicated by the sign "square" in FIG. 6). The correlation analysis unit 25 thus determines that the change of grease and the subsequent replacement of the speed reducers have a correlation.

In step S13, the correlation analysis unit 25 stores the correlation obtained by the correlation analysis in the correlation storage DB 34, and ends the process.

Figure 4:
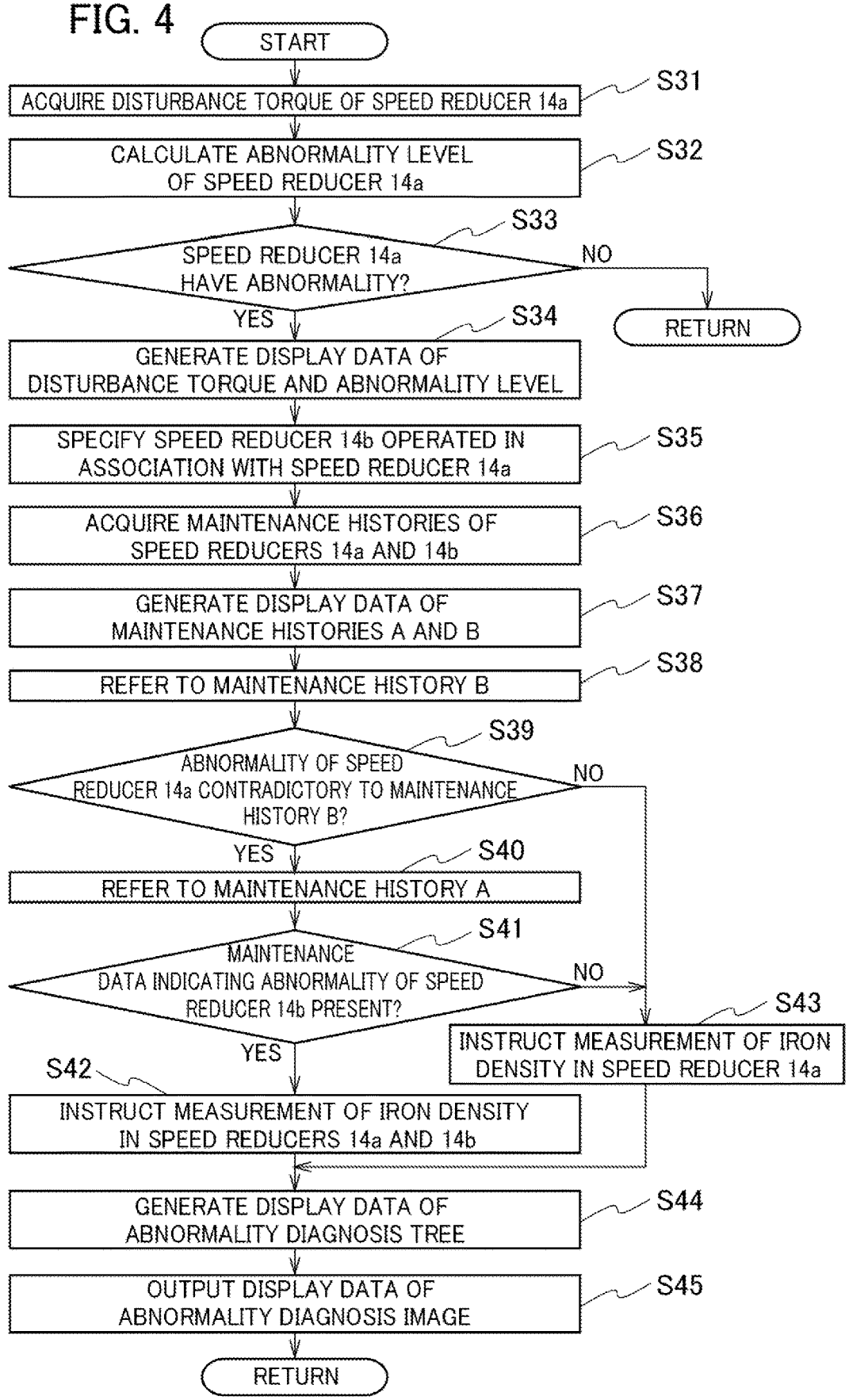
FIG. 4 is a flowchart showing a processing process executed by the abnormality diagnosis device according to the present embodiment.

FIG. 4 is a flowchart showing a process of the abnormality diagnosis processing. First, in step S31, the abnormality level determination unit 22 acquires the disturbance torque of one speed reducer (herein illustrated with the speed reducer 14a) from the sensor DB 31. The time-series data of the disturbance torque is thus obtained as illustrated in FIG. 5(a), for example.

In step S32, the abnormality level determination unit 22 calculates the abnormality level indicating a degree of abnormality of the speed reducer 14a according to the formula (1) described above. The time-series data of the abnormality level is thus obtained as illustrated in FIG. 5(b), for example.

In step S33, the abnormality level determination unit 22 determines whether an abnormality is caused in the speed reducer 14a in accordance with the abnormality level calculated by the processing in step S32. For example, when the abnormality level calculated exceeds the reference value of the abnormality level set to 1.0, the abnormality level_determination unit 22 determines that the speed reducer 14a has an abnormality. In the example shown in FIG. 5(b), the abnormality is determined to be caused since the abnormality level exceeds the reference value at the point indicated by the reference sign p1.

When the speed reducer 14a does not have any abnormality (NO in step S33), the process ends. The notification content setting unit 24 does not cause the information regarding the abnormality to be displayed when no speed reducers 14 have abnormality. The notification content setting unit 24 displays the information regarding the abnormality on the display 62 only when at least one of the speed reducers 14 is diagnosed to have an abnormality.

In step S34, the notification content setting unit 24 generates the display data on the disturbance torque and the abnormality level to be displayed on the display 62 of the user interface 103. The abnormality level display image 71 as the display data is thus generated as illustrated in FIG. 9.

In step S35, the abnormality prediction unit 23 obtains the list of the speed reducers 14 operated in association with the speed reducer 14a in accordance with the information stored in the correlation storage DB 24. The speed reducer 14b, for example, is then specified as the speed reducer 14 operated in association with the speed reducer 14a.

In step S36, the abnormality prediction unit 23 acquires the maintenance data on the speed reducers 14a and 14b from the maintenance history DB 32.

In step S37, the notification content setting unit 24 generates the display data on the maintenance history A (refer to FIG. 7A) and the maintenance history B (refer to FIG. 7B) to be displayed on the display 62. The maintenance history image 72 as the display data is thus generated as illustrated in FIG. 9.

In step S38, the abnormality prediction unit 23 refers to the maintenance history B. In step S39, the abnormality prediction unit 23 determines whether the abnormality detected in the speed reducer 14a is contradictory to the maintenance data in the maintenance history B. The process proceeds to step S40 when the abnormality is determined to be contradictory to the maintenance data (YES in step S39). The process proceeds to step S43 when abnormality is determined not to be contradictory to the maintenance data (NO in step S39).

According to the maintenance history B illustrated in FIG. 7B, the probability of occurrence of the abnormality in the speed reducer 14a this time is low, since the replacement of the speed reducer 14a has been made at the time t11, and the abnormality detected this time at the time t12 is within one year from the time t11. The abnormality detected in the speed reducer 14a is thus determined to be contradictory to the maintenance data in the maintenance history B (YES in step S39).

In step S40, the abnormality prediction unit 23 refers to the maintenance history A, and determines whether the maintenance data indicating the occurrence of abnormality in the speed reducer 14b is present in step S41. The process proceeds to step S42 when the maintenance data indicating the occurrence of the abnormality is present (YES in step S41), or the process proceeds to step S42 when no data is present (NO in step S41).

FIG. 7A illustrates the case in which the abnormality is detected in the speed reducer 14b at the time t1, and the change of grease is made at the time t2. The probability is thus high that any abnormality requiring the replacement to another speed reducer 14 is caused in the speed reducer 14b subsequently at the time t3. The maintenance data indicating the occurrence of the abnormality is then determined to be present (YES in step S41).

In step S42, the abnormality prediction unit 23 determines to instruct the measurement of the density of iron powder in the speed reducers 14a and 14b.

In step S43, the abnormality prediction unit 23 determines to instruct the measurement of the density of iron powder in the speed reducer 14a.

In step S44, the notification content setting unit 24 generates the display data of the tree image 73 as illustrated in FIG. 8. The tree image 73 is configured to allow the operator to easily recognize the details resulting in the contents of operation for instructing the operator in response to the detection of the abnormality in the speed reducer 14a. The notification content setting unit 24 further generates the display data of the abnormality level display image 71 indicating the disturbance torque and the abnormality level as shown in FIG. 5 and the display data of the maintenance history image 72 as shown in FIG. 7A and FIG. 7B so as to generate the display data of the abnormality diagnosis image 70 as shown in FIG. 9.

As shown in FIG. 9, the abnormality level display image 71 displayed includes the image of sign K1 (an image of a clip) and the image indicating "Abnormality level 2.1>Reference value 1.0". The same images as the sign K1 and the letters are indicated in the block q2 of the tree image 73. The same signs as those indicated in the abnormality level display image 71 are attached to the corresponding information included in the tree image 73 so as to generate the abnormality diagnosis image 70 including the tree image 73 and the abnormality level display image 71. The abnormality diagnosis image 70 is thus displayed with the configuration easy to recognize the correspondence relation between the tree image 73 and the abnormality level display image 71.

The maintenance history image 72 displayed includes the image of sign K2 and the image indicating "Speed reducer 14b: requiring attention". The same images as the sign K2 and the letters are indicated in the block q4 of the tree image 73. The same signs as those indicated in the maintenance history image 72 are attached to the corresponding information included in the tree image 73 so as to generate the abnormality diagnosis image 70 including the tree image 73 and the maintenance history image 72. The abnormality diagnosis image 70 generated is thus displayed with the configuration easy to recognize the correspondence relation between the tree image 73 and the maintenance history image 72.

In step S45, the notification content setting unit 24 outputs the display data of the abnormality diagnosis image 70 illustrated in FIG. 9 to the user interface 103. The process thus ends.

The display control unit 61 of the user interface 103 receives the display data of the abnormality diagnosis image 70, and displays the abnormality diagnosis image 70 as illustrated in FIG. 9 on the display 62. The operator, when seeing the image displayed on the display 62, can recognize that the abnormality has been detected in the speed reducer 14a in which the disturbance torque greatly fluctuates, and the probability is thus high that the speed reducer 14b operated in association with the speed reducer 14a has an abnormality.

As described above, the abnormality diagnosis device 102 according to the first embodiment can achieve the following effects:

(1)

When an abnormality is detected in the speed reducer 14a (one movable part) according to the disturbance torque of the speed reducer 14a (the data regarding the state of the one movable part), the abnormality diagnosis device 102 predicts an abnormality of the speed reducer 14b (another movable part) operated in association with the speed reducer 14a, and displays the information regarding the abnormality on the display 62. The abnormality diagnosis device 102 can notify the operator of not only the abnormality detected in the speed reducer 14a but also the abnormality in the speed reducer 14b determined to have a probability of occurrence in association with the abnormality detected in the speed reducer 14a, so as to enable the wide abnormality analysis for the speed reducers 14.

(2)

The abnormality prediction unit 23 determines the information regarding the abnormality in the speed reducers 14 in accordance with the time of the maintenance having been made for the respective speed reducers 14 and the contents of the maintenance such as the change of grease or the replacement of the speed reducers 14 obtained from the maintenance data stored in the maintenance history DB 32. This enables the abnormality diagnosis of the speed reducers 14 with a higher accuracy.

(3)

When the abnormality is detected in the speed reducer 14a, the abnormality prediction unit 23 refers to the maintenance data on the speed reducer 14b operated in association with the speed reducer 14a, and determines the information regarding the abnormality of the speed reducer 14b. This enables the abnormality diagnosis of the speed reducers 14 with a high accuracy.

(4)

The correlation analysis unit 25 executes the correlation analysis in accordance with the abnormality caused in the respective speed reducers 14 and the contents of the maintenance to be made for the respective speed reducers 14, and stores the correlation between the respective speed reducers 14 in the correlation storage DB 34. When the abnormality is detected in the speed reducer 14a, the correlation analysis unit 25 predicts the occurrence of the abnormality in the speed reducer 14b having a correlation with the abnormality caused in the speed reducer 14a in accordance with the correlation stored in the correlation storage DB 34. This enables the abnormality diagnosis with a high accuracy according to the correlation between the abnormality caused in the respective speed reducers 14 and the maintenance made for the respective speed reducers 14.

(5)

When the abnormality is detected in the speed reducer 14a, the display data of the tree image 73 as illustrated in FIG. 9 is generated. The tree image 73 emphasizes the indication of the process from the occurrence of the abnormality to the execution of the maintenance. In particular, the frames of the blocks q1 to q5 illustrated in FIG. 9 are surrounded by the thick lines. This indication can allow the operator, when seeing the tree image 73 of the abnormality diagnosis, to systematically recognize the details from the occurrence of the abnormality to the execution of the maintenance. This enables the display of the abnormality diagnosis image 70 with the configuration allowing the operator to easily recognize who does not have technical knowledge about the robot 101. The frames may be indicated by shading or in display colors for emphasis.

(6)

As illustrated in FIG. 9, the sign K2 shown in the maintenance history image 72 is the same as shown in the corresponding part (the block q4) in the abnormality diagnosis tree. The operator thus can recognize the tree image 73 in the state of being associated with the contents which are the basis thereof with the same sign. This can provide the indication to the operator with the configuration easy to understand.

(7)

As illustrated in FIG. 9, the sign K1 shown in the abnormality level display image 71 indicating the disturbance torque and the abnormality level is the same sign as shown in the corresponding part (the block q2) in the abnormality diagnosis tree. The operator thus can recognize the tree image 73 in the state of being associated with the contents which are the basis thereof with the same sign. This can provide the indication to the operator with the configuration easier to understand.

(8)

As illustrated in FIG. 9, the tree image 73 indicates the abnormality caused in the speed reducer 14a in the state of being associated with the contents of the maintenance to be made for the speed reducer 14b predicted to have an abnormality. This can notify the operator of the contents of the maintenance (the block q5, q7, or q8) to be executed for the abnormality caused in the speed reducer 14a with the configuration easy to recognize.

(9)

The notification content setting unit 24 outputs the display command for displaying the diagnosis image as illustrated in FIG. 9 only when an abnormality is detected in at least one speed reducer 14. This can eliminate unnecessary indication. In addition, the abnormality diagnosis image 70 is not displayed when no abnormality is caused, so as to avoid a problem of making an error of recognition of whether an abnormality is caused.

Explanations of Modified Example of First Embodiment

Figure 10:
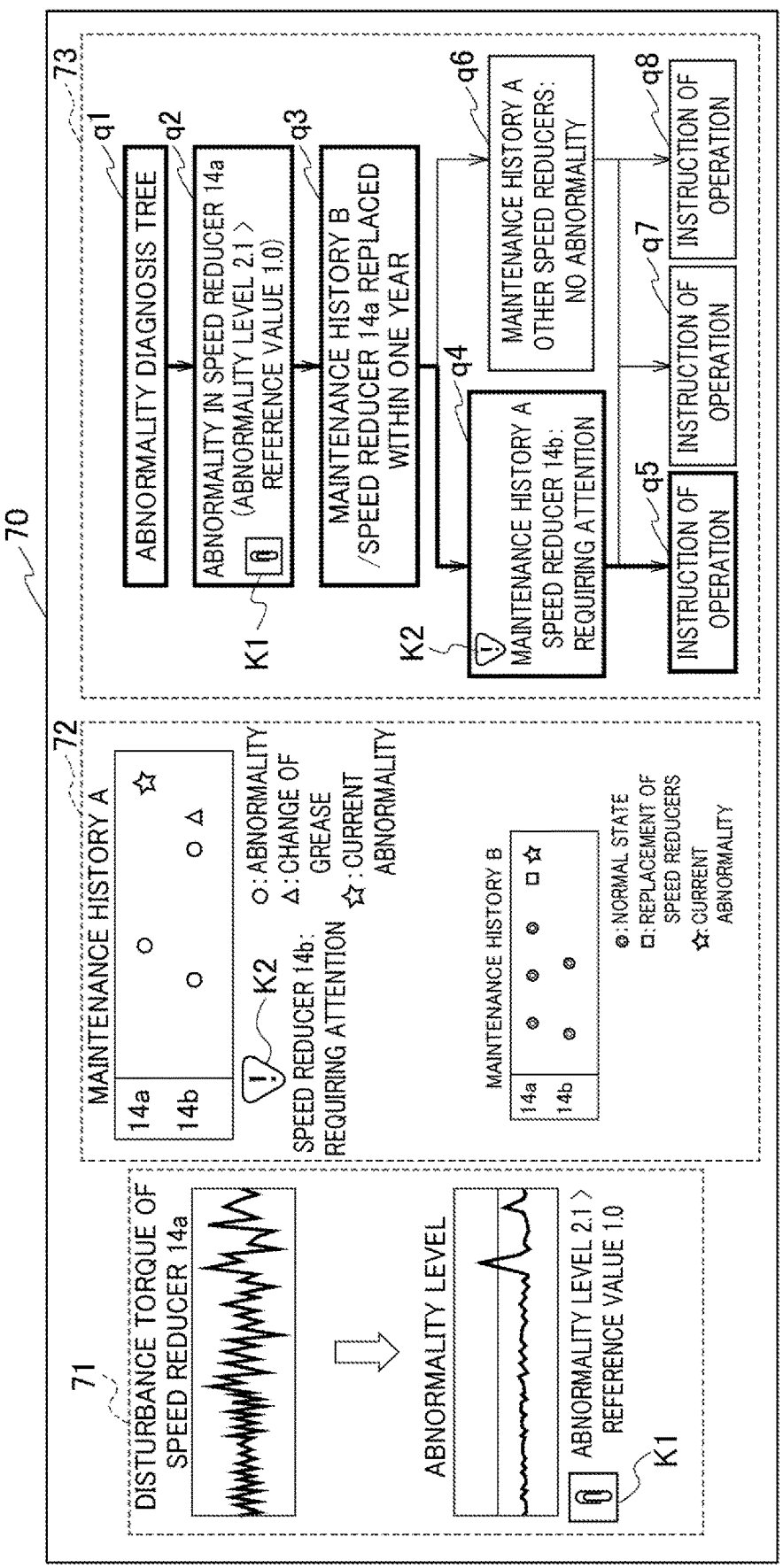
FIG. 10 is an explanatory diagram showing the abnormality diagnosis image displayed on the display, illustrating the maintenance history A with a larger size than the maintenance history B.

A modified example of the above first embodiment is described below. In the modified example, either the maintenance history A or the maintenance history B, which is the basis for predicting the abnormality in the speed reducer 14b, is enlarged or emphasized to be displayed as the maintenance history image 72. While the two maintenance histories, the maintenance history A and the maintenance history B, having different scales in the time axis are displayed, either one of the maintenance histories which is the basis for predicting the occurrence of the abnormality is enlarged or emphasized. For example, as illustrated in FIG. 10, the maintenance history A is displayed with a larger size than the maintenance history B. This can notify the operator of the basis resulting in the determination that the speed reducer 14b has an abnormality with the configuration easier to recognize.

Explanations of Second Embodiment

A second embodiment of the present invention is described below. A device configuration of an abnormality diagnosis device according to the second embodiment is the same as that described above with reference to FIG. 1. The second embodiment differs from the first embodiment described above in causing the correlation analysis unit 25 shown in FIG. 1 to execute machine learning to create a leaning model according to the data on the abnormality having been detected in the respective speed reducers 14 and the history of the maintenance having been made. In particular, the correlation analysis unit 25 executes the machine learning for learning patterns of the maintenance data having a high probability of the occurrence of abnormality, in accordance with the maintenance data on the respective speed reducers 14 at least within a part of periods stored in the maintenance history DB 32. The correlation analysis unit 25 also detects an abnormality of the respective speed reducers 14 in accordance with the results of the machine learning.

The machine learning extracts the rules from the past abnormality data and maintenance data included in the maintenance history so as to create the learning model. A method of the machine learning may be known "supervised learning", for example.

The "supervised learning" acquires a large amount of the data on the abnormality having been detected and the data on the maintenance having been made so as to create the learning model according to the combination of these data, the order of occurrence, and intervals of occurrence. FIG. 11 is a timing chart showing the maintenance (H1 to Hn) executed for the respective speed reducers 14 and the abnormality detected in the respective speed reducers 14. As illustrated in FIG. 11, the supervised learning creates the learning model by the machine learning in accordance with the relationship between the contents (refer to reference numeral 201) of each type of maintenance (H1 to Hn) having been made for the respective speed reducers 14 at the past point before the time t21 (for example, one month before) and the data on the abnormality caused in the respective speed reducers 14. The leaning model created is stored in the correlation storage DB 34.

Another method, "unsupervised learning", other than the supervised learning may be used to create the learning model. Another method, "deep learning", other than the machine learning may be used to create the learning model.

The abnormality prediction unit 23 refers to the learning model stored in the correlation storage DB34 when an abnormality is detected in one speed reducer 14, and extracts other speed reducers 14 having a high probability of occurrence of an abnormality.

The processing process in the abnormality diagnosis device according to the second embodiment is the same as that in the first embodiment excluding the use of the learning model, and overlapping explanations are not repeated below.

As described above, the abnormality diagnosis device according to the second embodiment creates the learning model by use of the machine learning according to the data on the maintenance having been executed before for the respective speed reducers 14. When an abnormality is caused in the speed reducer 14a, the abnormality diagnosis device refers to the learning model described above so as to predict an abnormality caused in the speed reducer 14b. The abnormality diagnosis device thus can execute the abnormality diagnosis of the speed reducers 14 with a higher accuracy.

The apparatus as a target for the abnormality diagnosis is not limited to the robot 101. For example, an engine of a vehicle instead of the motor or a transmission instead of the speed reducer 14 may be applicable as a target. Any apparatus including a rotating mechanism and a transmitting mechanism thereof can be a target for the abnormality diagnosis, such as a rotating mechanism of a moving object, a moving object such as playground equipment in an amusement park, and a work machine such as a three-dimensional printer. Any other types of apparatus may also be a target for the abnormality diagnosis.

The abnormality diagnosis device may be installed in a remote place to send/receive necessary signals or data via a communication line so as to determine an abnormality of the apparatus. The abnormality diagnosis may be executed for a plurality of apparatuses by a single abnormality diagnosis device. The plural apparatuses may be installed at different locations.

While the present invention has been described above by reference to the embodiments, it should be understood that the present invention is not intended to be limited to the descriptions and the drawings composing part of this disclosure. Various alternative embodiments, examples, and technical applications will be apparent to those skilled in the art according to this disclosure.

REFERENCE SIGNS LIST

11 COMMUNICATION UNIT
12 DISTURBANCE TORQUE CALCULATION UNIT
13 SENSOR
14 SPEED REDUCER
15 ACTION CONTROL UNIT
21 COMMUNICATION UNIT (CONTROL UNIT)
22 ABNORMALITY LEVEL DETERMINATION UNIT (CONTROL UNIT)
23 ABNORMALITY PREDICTION UNIT (CONTROL UNIT)
24 NOTIFICATION CONTENT SETTING UNIT (CONTROL UNIT)
25 CORRELATION ANALYSIS UNIT (CONTROL UNIT)
31 SENSOR DB
32 MAINTENANCE HISTORY DB (MAINTENANCE HISTORY STORAGE UNIT)
33 ABNORMALITY PREDICTION DB
34 CORRELATION STORAGE DB (CORRELATION STORAGE UNIT)
61 DISPLAY CONTROL UNIT
62 DISPLAY (DISPLAY UNIT)
101 ROBOT
102 ABNORMALITY DIAGNOSIS DEVICE
103 USER INTERFACE (UI)

The invention claimed is:

1. An abnormality diagnosis device for diagnosing an abnormality of a plurality of movable parts included in an apparatus comprising:
a sensor installed in the apparatus, wherein movable-part data regarding a state of the plurality of movable parts is acquired from the sensor;
a maintenance history database configured to store maintenance data on maintenance made for the respective movable parts; and
an information processing circuit configured to detect the abnormality in the respective movable parts in accordance with the movable-part data,
the information processing circuit further configured to:
determine, in response to detecting the abnormality in one movable part of the plurality of movable parts in accordance with the movable part data, whether the abnormality has occurred in any of other movable parts of the plurality of movable parts caused in association with the abnormality in the one movable part in accordance with the maintenance data,
execute a contradiction analysis between the abnormality detected in the one moveable part and the maintenance data,
determine, in response to the abnormality in the one moveable part not being contradictory to the maintenance data, a maintenance command for the one moveable part,
determine, in response to a contradiction between the abnormality detected in the one moveable and the maintenance data, whether the maintenance data indicates the occurrence of the abnormality in any of the other moveable parts by referring to the maintenance data stored in the maintenance history database,
determine, in response to the maintenance data indicating the occurrence of the abnormality in any of the other moveable parts, a maintenance command for the one moveable part and any of the other moveable parts; and
output, when determining the abnormality in any of the other moveable parts, information on the abnormality detected in the one moveable part and information on the abnormality determined in any of the other movable parts to a display, the information including maintenance commands for the one movable part and for any of the other movable parts, respectively,
wherein the sensor comprises an encoder and a torque sensor,
wherein the movable-part data comprises a position of the one movable part and a measured torque at the one movable part, the position and the measured torque determined with the encoder and torque sensor, respectively.

2. The abnormality diagnosis device according to claim 1, wherein the information processing circuit determines the information on the abnormality in any of the other movable parts in accordance with a time of the maintenance and a content of the maintenance made for the respective movable parts acquired from the maintenance data stored in the maintenance history database.

3. The abnormality diagnosis device according to claim 1, wherein the information processing circuit, when detecting the abnormality in the one movable part, refers to the maintenance data regarding the abnormality of at least one of the other movable parts to determine the information on the abnormality in any of the other movable parts.

4. The abnormality diagnosis device according to claim 1, further comprising a correlation storage unit configured to store a correlation between the abnormality caused in the one movable part and the abnormality caused in any of the other movable parts,
wherein the information processing circuit, when detecting the abnormality in the one movable part, refers to the correlation stored in the correlation storage unit to predict the abnormality in any of the other movable parts having the correlation with the abnormality detected in the one movable part.

5. The abnormality diagnosis device according to claim 1, wherein the information processing circuit executes machine learning for learning a pattern of the maintenance data that has a high probability of an occurrence of an abnormality based on the maintenance data regarding the respective movable parts at least within a part of periods stored in the maintenance history database to predict the abnormality in any of the other movable parts in accordance with a result of machine learning.

6. The abnormality diagnosis device according to claim 1, wherein the information processing circuit is configured to:
when detecting the abnormality in the one movable part, generate a tree image indicating, with a tree structure, information on the one movable part and information on the other movable parts; and
output the information on the other movable parts to the display while changing a displaying configuration of the information depending on a content upon predicting the abnormality in the other movable parts.

7. The abnormality diagnosis device according to claim 6, wherein the information processing circuit is configured to:
generate a maintenance history image indicating the maintenance data on the one movable part and at least one of the other movable parts in a time-series manner in addition to the tree image; and when predicting the abnormality in any of the other movable parts, cause the maintenance history image to be accompanied with a sign indicating the maintenance data that is a basis upon predicting, and cause the information on the other movable parts in the tree image to be accompanied with the same sign to output the tree image and the maintenance history image to the display.

8. The abnormality diagnosis device according to claim 7, wherein the information processing circuit is configured to:
generate, as the maintenance history image, a first maintenance history image and a second maintenance history image having a different scale in a time axis from the first maintenance history image; and
emphasize or enlarge and output, to the display, either the first maintenance history image or the second maintenance history image including the maintenance data that is the basis upon predicting the abnormality in any of the other movable parts.

9. The abnormality diagnosis device according to claim 6, wherein the information processing circuit is configured to:
calculate an abnormality level indicating a degree of abnormality caused in the movable-part data;
generate an abnormality level display image including the movable-part data and the abnormality level in addition to the tree image; and
when predicting the abnormality in any of the other movable parts, cause the abnormality level display image to be accompanied with a sign indicating the abnormality level that is a basis upon predicting, and cause the information on the other movable parts in the tree image to be accompanied with the same sign to output the tree image and the maintenance history image to the display.

10. The abnormality diagnosis device according to claim 6, wherein the tree image includes a maintenance command for the one movable part and any of the other movable parts in which an occurrence of the abnormality is predicted, and is associated with a relation between the occurrence of the abnormality and the maintenance command.

11. The abnormality diagnosis device according to claim 1, wherein the information processing circuit outputs the information on the abnormality to the display only when diagnosing at least one of the movable parts as having the abnormality.

12. The abnormality diagnosis device according to claim 1,
wherein when detecting the abnormality in one movable part, determining whether the abnormality has occurred in any of the other movable parts of the plurality of movable parts comprises:
determining, based on the maintenance data, whether maintenance correlated with the abnormality detected in the one movable part has occurred in any of the other movable parts,
determining, based on a correspondence relation, whether any of the other movable parts are operated in association with the one movable part,
wherein, the abnormality is determined to have occurred in a first movable part of the other movable parts in response to the determinations that the first movable part is operated in association with the one movable part and that the maintenance has occurred in the first movable part.

13. An abnormality diagnosis method for diagnosing an abnormality of a plurality of movable parts included in an apparatus comprising:
acquiring movable-part data regarding a state of the respective movable parts from a sensor installed in the apparatus;
detecting the abnormality in one movable part of the plurality of movable parts in accordance with the movable-part data, determining the abnormality has occurred in any of other movable parts of the plurality of movable parts caused in association with the abnormality in the one movable part in accordance with maintenance data on maintenance made for the respective movable parts;
executing a contradiction analysis between the abnormality detected in the one moveable part and the maintenance data;
determining, in response to the abnormality in the one moveable part not being contradictory to the maintenance data, a maintenance command for the one moveable part;
determining, in response to a contradiction between the abnormality detected in the one moveable and the maintenance data, whether the maintenance data indicates the occurrence of the abnormality in any of the other moveable parts; and
determining, in response to the maintenance data indicating the occurrence of abnormality in any of the other moveable parts, a maintenance command for the one moveable part and any of the other moveable parts; and
outputting, in response to determining that the abnormality has occurred in any of the other moveable parts, information on the abnormality detected in the one moveable part and information on the abnormality determined predicted in any of the other moveable parts to a display the information including maintenance commands for the one movable part and for any of the other movable parts, respectively,
wherein the sensor comprises an encoder and a torque sensor,
wherein the movable-part data comprises a position of the one movable part and a measured torque at the one movable part, the position and the measured torque determined with the encoder and torque sensor, respectively.

14. An abnormality diagnosis device for diagnosing an abnormality in one or more of a plurality of movable parts of an apparatus, comprising:
a sensor installed in the apparatus, wherein movable-part data regarding a state of the plurality of movable parts is acquired from the sensor, the sensor comprising:
an encoder, and
a torque sensor;
a maintenance history database configured to store maintenance data on maintenance made for the respective movable parts;
a correlation storage database comprising:
a correspondence relation that indicates that a first movable part and a second movable part comprised by the plurality of movable parts are operated in association with each other, and
a correlation, determined using the maintenance history database, that relates maintenance to the abnormality; and
an information processing circuit configured to:
detect, based on the movable-part data, the abnormality in the first movable part, make a first determination based on the maintenance history database, whether the maintenance has occurred in the second movable part, and determine, based on the first determination that the maintenance has occurred in the second movable part, that the abnormality has occurred in the second movable part based on the detected abnormality in the first movable part and the correspondence relation, execute a contradiction analysis between the abnormality detected in the first moveable part and the maintenance data;

determine, based on the contradiction analysis, a maintenance command for one or more of the first and second movable parts; and output information on the abnormality detected in the first and second movable parts to a display, the information including the maintenance command, wherein the movable-part data comprises a position of the first movable part and a measured torque at the first movable part, the position and the measured torque determined with the encoder and torque sensor, respectively.

15. The abnormality diagnosis device according to claim 14, wherein the information processing circuit is further configured to:

output, to a display, in response to the determination that the abnormality has occurred in the second movable part, that the abnormality is detected in the second movable part despite only being directly detected in the first movable part.

* * * * *